J. McELLIOTT.
MOVABLE HEADLIGHT.
APPLICATION FILED JUNE 10, 1909.
983,831.
Patented Feb. 7, 1911.
3 SHEETS—SHEET 2.
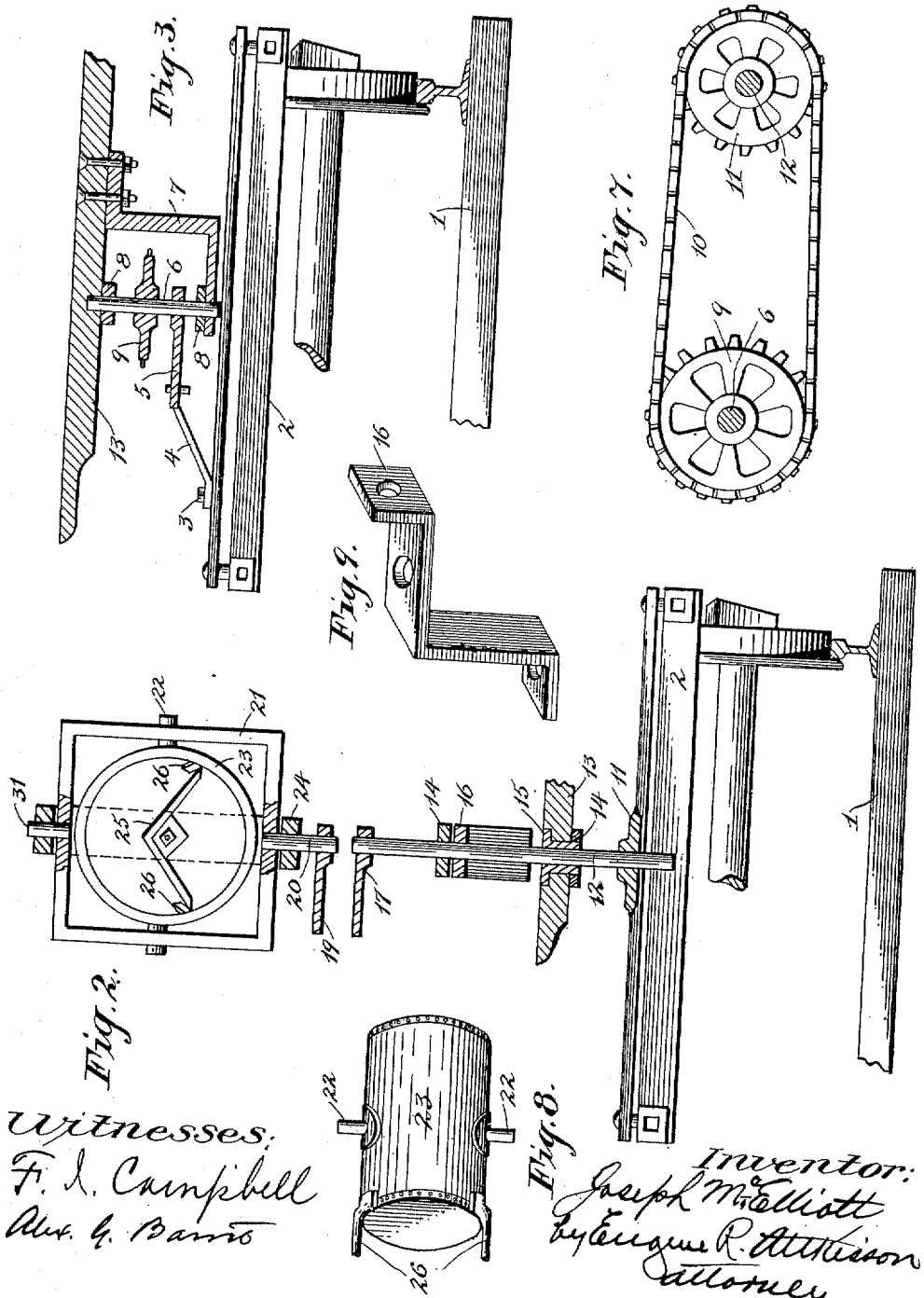
Witnesses:
F. L. Campbell
Alex. G. Barrio
Inventor:
Joseph McElliott
by Eugene R. Atkinson
Attorney J. McELLIOTT.
MOVABLE HEADLIGHT.
APPLICATION FILED JUNE 10, 1909.

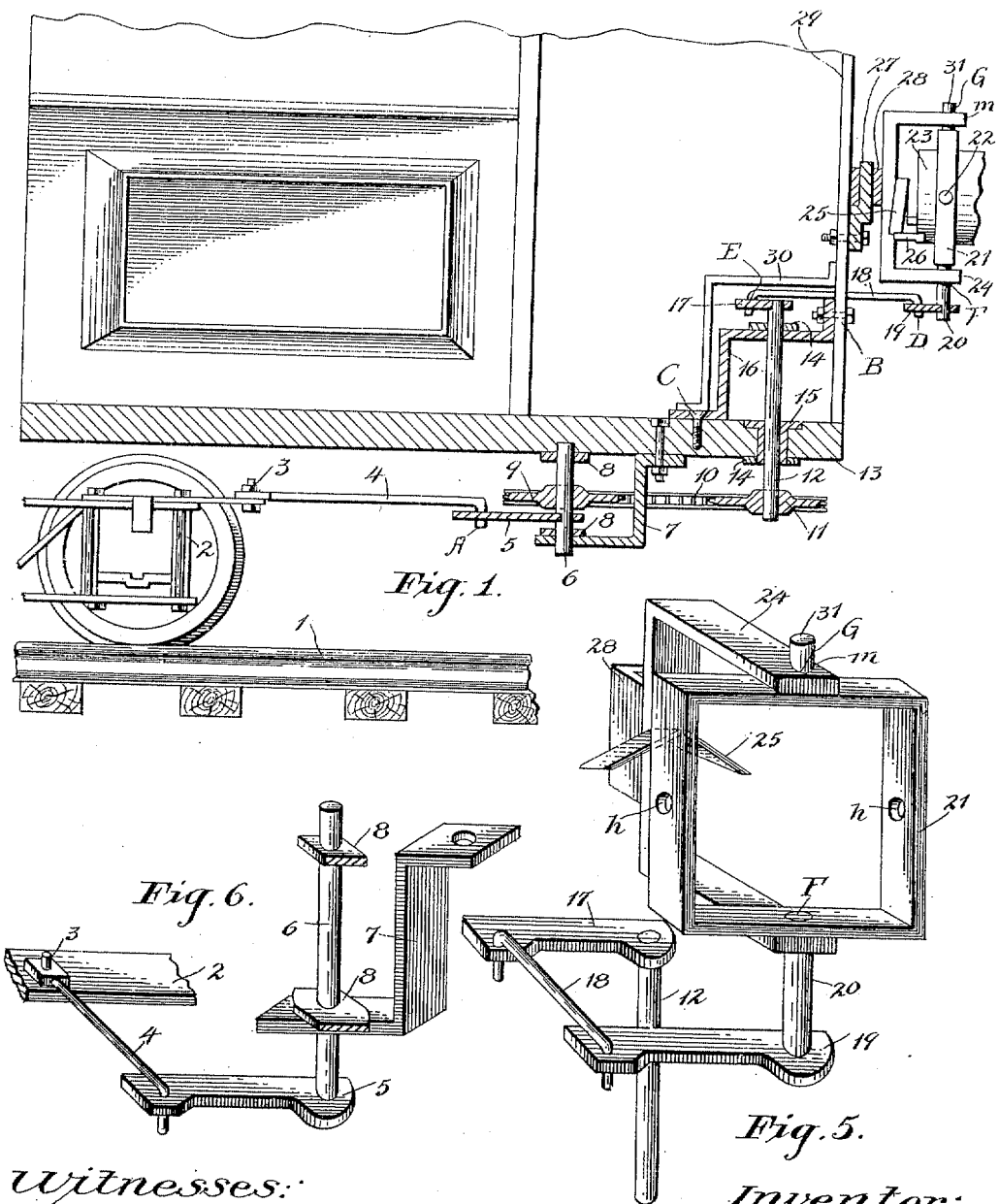

983,831.

Patented Feb. 7, 1911.

3 SHEETS—SHEET 3.

Witnesses:
F. I. Campbell.
Alex. G. Barre.

Inventor:
Joseph McElliott
by Eugene R. Atkinson
Attorney

ES PATENT OFFICE.

JOSEPH McELLIOTT, OF LOUISVILLE, KENTUCKY, ASSIGNOR TO THE AUTOMATIC MOVABLE HEADLIGHT COMPANY, OF TOLEDO, OHIO, A CORPORATION OF OHIO.

MOVABLE HEADLIGHT.

983,831.      Specification of Letters Patent.      Patented Feb. 7, 1911.

Application filed June 10, 1909. Serial No. 501,444.

*To all whom it may concern:*

Be it known that I, JOSEPH McELLIOTT, a citizen of the United States, and a resident of Louisville, in the county of Jefferson and State of Kentucky, have invented a certain new and useful Improvement in Movable Headlights; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in movable headlights for electric cars, locomotives or other vehicles and has for its object and purpose to provide a means whereby the headlight is connected with the truck or running gear of said car, locomotive or vehicle so that the rays of light from the headlight will be directed along a path in line with the longitudinal center of the vehicle and therefore directly ahead of same, but when the track or roadway is curved the rays from the headlight will be automatically deflected in the direction of the curve, tilting in proportion to the degree of the curve, and moving to the right and left with, and faster proportionately than the trucks, in order that the rays of light from said headlight are deflected at all times, in proportion to the degree of the curve, along the center of the track.

The invention is fully described in the following specification, and while in its broader aspect it is capable of embodiment in numerous forms and of being used in numerous connections, a simple and preferred form of the same in association with a car is illustrated in the accompanying drawings, in which,—

Figure 4:
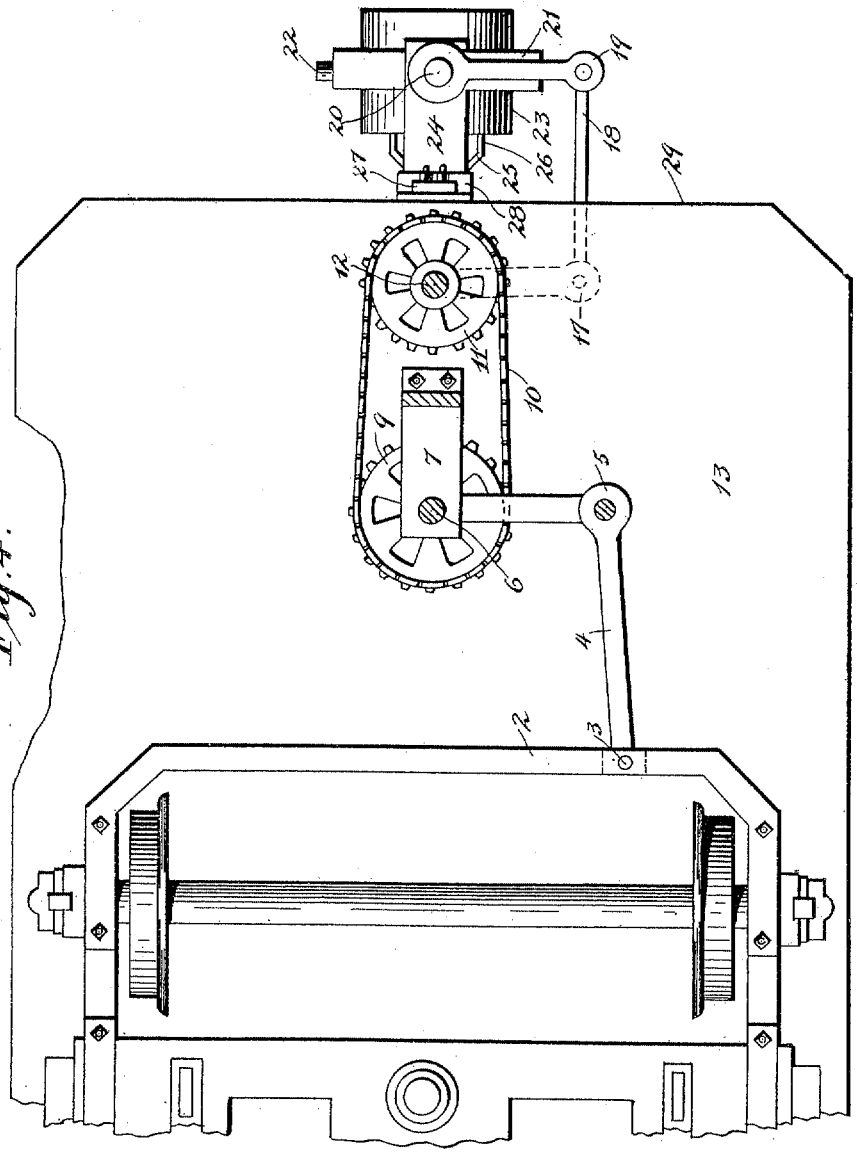
Figure 10:
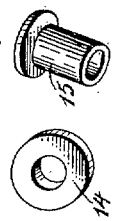

Figure 1 represents a side elevation of a car equipped with my mechanism for operating the headlight. Fig. 2 represents a vertical cross section through the vestibule on a line with the front of the vestibule and represents a rear plan view of the headlight mechanism above the floor in position. Fig. 3 represents a vertical cross section of the mechanism below the floor of car and as attached thereto. Fig. 4 represents the bottom plan view of vestibule of car with mechanism in position. Fig. 5 represents a front view of frame for headlight and connecting parts. Fig. 6 represents a top plan view in perspective showing connecting parts to truck frame and body of car. Fig. 7 represents the sprockets and chain connected, but detached from position. Fig. 8 represents a longitudinal view of the top of headlight detached from the frame. Fig. 9 represents a perspective view of a bracket detached. Fig. 10 represents collars used for bearings to shaft detached.

Referring to the drawings, 1 designates a longitudinal section of a railroad track, and 2 refers to an ordinary car truck or locomotive pony truck. My device is operated by the change in position of the truck to which the device is attached by pin 3, which is stationary upon the frame of the truck at the point indicated in Fig. 4.

4 is a rod pivoted so as to move freely upon pin 3 and connects the frame of truck with arm 5, to which it may be fastened in any convenient manner, but is preferably hooked into a bearing in arm 5 as at A. Arm 5 is stationary upon shaft 6, and 7 is a bracket bolted to the bottom of the car or locomotive, to which it is attached, and serves to hold shaft 6 in place.

8 are small collars which are stationary upon shaft 6 and serve to prevent shaft 6 from slipping out of place.

9 is a sprocket wheel stationary upon shaft 6. Sprocket wheel 9 is connected by sprocket chain 10 to 11 which is a sprocket wheel stationary upon shaft 12, which goes through the floor of the car indicated by 13. Shaft 12 is held in place by bracket 16 which is bolted to the front end of the floor of the car as indicated at B and C. Shaft 12 is rotatively mounted in a bearing 15 in the floor of the car, and collars 14, 14 are fast to the shaft and are respectively arranged above the bracket 16 and below the bearing 15, and thus prevent any undue vertical movement of the said shaft. Arm 17 is stationary upon shaft 12, and arm 19 is stationary upon shaft 20 attached to bottom of bracket 24, and 18 is a rod connecting the two arms 17 and 19. Said rod may be connected in a suitable manner, but is preferably hooked into bearings in said arm as at D and E.

27 is a bracket bolted on the front of the car 29, and 28 is a truck or bracket containing a socket which fits over 27, and 24 is a brace or bracket firmly attached to truck 28 and serves as a stationary support to 21, which is a metal frame for containing the lamp 23. Lamp frame 21 is arranged so as to work freely in bracket 24. Arm shaft 20 and pivot 31 are firmly attached to frame 21 and are journaled on bearings in 24 at F and G. The lamp 23 has pivots 22 riveted to its sides and brackets or lugs 26 which are riveted upon and project to the rear of the lamp.

25 is a V shaped angle iron which is firmly fastened to bracket 24 so as to make a double inclined plane.

When the car, locomotive or vehicle to which the device is attached is going in a straight line the lugs 26 rest easily upon the lower points of 25, but when going around curves, lugs 26 will climb upon incline 25, thereby elevating the back of the lamp 23 so as to make the light follow the curve in exact conformity thereto, and in proportion to the degree of the curve, whether the direction be to the right or to the left.

The front end of the car is designated by 29, and 30 represents a cover for concealing the parts of the device inside the car.

When my device is attached in use the lamp conforms to the movements of the truck. When the car is traveling in a direct line the lamp is stationary, and throws its light directly to the front. When the car is moving upon a right curve the frame of the truck, by its connection with the device at pivot 3, pulls upon rod 4, which draws backward arm 5, and then imparts a motion which turns sprockets 9 and 11 to the right, and the movement is imparted through shaft 12 to arm 17 and by rod 18 to arm 19 which turns shaft 20 and frame 21 to the right so that right lug 26 climbs upward from neutral position on incline 25, and the front of lamp 23 is thereby gradually turned to the right and in this manner follows the curves, projecting the light directly on the track. When the car is moving on a left curve, all of the parts of the device turn successively to the left and the left lug 26 climbs upward, from neutral position, on incline 25, and the front of lamp 21 moves to the left and follows the curve, projecting the light directly on the track.

Sprocket 9 is larger than sprocket 11, for the reason that the body of the car in rounding a curve extends beyond the line of the truck, and 9 must have a higher diameter of revolution than 11 in order to overcome the shortening of distance by the curve and to make the lamp follow the curve of the track in proportion to the degree of the curve, regardless of the projection of the car body, the lamp being required to change position faster than the body of the car, as the movements of the lamp must conform to the movement of the truck rather than to the body of the car.

I wish it understood that my invention is not limited to any specific construction or arrangement of the parts except in so far as such limitations are specified in the claims.

Having thus described my invention, what I claim as new and desire to secure by Letters Patent is,—

1. The combination with a vehicle and a part which turns relative thereto in following a curved course, of a head-light mounted for horizontal and vertical oscillatory movements, mechanism connecting said head-light and part for imparting horizontal oscillatory movements to the head-light when the part is turned relative to the vehicle, and a cam coöperating with the head-light to impart like tilting movements thereto when horizontally oscillated in either direction from neutral position.

2. The combination with a vehicle and a part which turns relative thereto in following a curved course, of a head-light mounted for horizontal and oscillatory movements, mechanism connecting said head-light and part for imparting horizontal oscillatory movements to the head-light when the part is turned relative to the vehicle, and a cam having oppositely inclined portions and coöperating with the head-light to impart like tilting movements thereto when horizontally oscillated in either direction from neutral position.

3. The combination with a vehicle and a part which turns relative thereto in following a curved course, of a bracket carried by the vehicle, a vertical shaft journaled in such bracket, a head-light carried by such shaft for horizontal oscillatory movements therewith and vertical tilting movements thereto, mechanism connecting said shaft and part for imparting rocking movements to the shaft when the part is turned relative to the vehicle, and a cam carried by the bracket and coöperating with the head-light to impart like tilting movements thereto when horizontally oscillated in either direction from a neutral position.

4. The combination with a vehicle and a part which turns relative thereto in following a curved course, of a headlight mounted for horizontal and vertical oscillatory movements, means connecting said headlight and part for imparting predetermined horizontal oscillatory movements to the headlight when said part is turned relative to the vehicle, and cam means fixed relative to the vehicle and acting on a part of the headlight to impart vertical tilting movements thereto when horizontally oscillated in either direction.

5. The combination with a vehicle and a part which turns relative thereto in following a curved course, of a vertical shaft, a headlight carried by such shaft for horizontal and vertical oscillatory movements, means connecting said shaft and part for imparting rocking movements to the shaft and headlight when said part is turned relative to the vehicle, and cam means fixed relative to the vehicle and coöperating with a part of the headlight to impart vertical tilting movements thereto when turned with the shaft.

6. The combination with a vehicle and a part which turns relative thereto in following a curved course, of a bracket carried by the vehicle, a vertical shaft journaled in such bracket, a headlight carried by such shaft for horizontal oscillatory movements therewith and vertical tilting movements relative thereto, mechanism connecting said shaft and part for imparting rocking movements to the shaft when the part is turned relative to the vehicle, and means fixed relative to the bracket and coöperating with the headlight to impart vertical tilting movements thereto when horizontally oscillated.

7. In combination with a truck and car-body of a head-light mechanism, comprising a bracket, means for attaching said bracket to the front of the car-body, a V shaped angle-iron firmly fixed within the said bracket, a frame vertically adjusted in said bracket and pivoted so as to turn laterally in either direction, a head-light pivotally adjusted within said frame and having lugs projecting from the rear so as to move freely upon the lateral incline planes made by said V shaped angle iron, a shaft vertically connected with and serving as an axis for the said frame, and means for communicating motion to the said shaft from the truck frame, whereby the head-light is caused to turn in either direction.

8. In a head-light mechanism, the combination with a bracket, of upwardly inclined converging tracks carried thereby, a laterally swinging frame supported by the bracket, a head-light journaled in the frame, means projecting from the head-light and respectively engaging the converging tracks, and an actuating mechanism for swinging the headlight laterally in either direction and simultaneously causing one of the projecting means to engage one of the converging tracks and thereby forwardly tilt the said head-light.

9. In combination with a truck frame and car body, of a bracket detachably secured to the said body, upwardly inclined converging tracks carried thereby, a laterally swinging frame supported by the bracket, a headlight journaled in the frame, means projecting from the headlight and respectively engaging the converging tracks, and an actuating mechanism connecting the frame and the truck for swinging the headlight laterally in either direction upon the corresponding swinging of the truck, and for simultaneously causing one of the projecting means to engage the converging tracks and thereby forwardly tilt the said headlight.

10. In a headlight mechanism, the combination with a U-shaped bracket, of a rectangular frame journaled between the outer ends of the legs of the bracket, a headlight journaled in the frame at right angles to the movement of the frame, and means carried by the bracket for tilting the headlight upon the swinging of the frame in either direction.

11. In combination with a truck frame and body, of a hook secured to the body, a U-shaped bracket having a socket adapted to be seated upon the hook, an inverted and substantially V-shaped track secured to the bracket, a frame journaled between the outer ends of the legs of the bracket, a headlight journaled in the frame and provided with projections adapted to respectively engage the opposite sides of the V-shaped track, and means connecting the frame and the truck frame for swinging and tilting the head-light upon the corresponding swinging of the said truck frame.

In testimony whereof I have signed my name to this specification in the presence of two subscribing witnesses.

JOSEPH McELLIOTT.

Witnesses:
EUGENE R. ATTKISSON,
IRENE CAMPBELL.